United States Patent
Nguyen et al.

(10) Patent No.: US 9,432,590 B2
(45) Date of Patent: Aug. 30, 2016

(54) DCT BASED FLICKER DETECTION

(71) Applicant: NVIDIA CORPORATION, Santa Clara, CA (US)

(72) Inventors: Hugh Phu Nguyen, Milpitas, CA (US); Yining Deng, Fremont, CA (US); Eric Francois Xavier Dujardin, San Jose, CA (US); Abhinav Sinha, Sunnyvale, CA (US)

(73) Assignee: NVIDIA Corporation, Santa Clara, CA (US)

( * ) Notice: Subject to any disclaimer, the term of this patent is extended or adjusted under 35 U.S.C. 154(b) by 11 days.

(21) Appl. No.: 14/161,584

(22) Filed: Jan. 22, 2014

(65) Prior Publication Data
US 2015/0207975 A1 Jul. 23, 2015

(51) Int. Cl.
*H04N 5/235* (2006.01)
*H04N 5/353* (2011.01)

(52) U.S. Cl.
CPC .......... *H04N 5/2357* (2013.01); *H04N 5/3532* (2013.01)

(58) Field of Classification Search
CPC .................................... H04N 5/2357
USPC ....................................................... 348/226.1
See application file for complete search history.

(56) References Cited

U.S. PATENT DOCUMENTS

| 2007/0013785 A1* | 1/2007 | Kinoshita et al. | 348/222.1 |
| 2011/0058706 A1* | 3/2011 | Xiong et al. | 382/100 |
| 2012/0236175 A1* | 9/2012 | Kinrot | 348/226.1 |

* cited by examiner

*Primary Examiner* — Nelson D. Hernández Hernández
(74) *Attorney, Agent, or Firm* — Artegis Law Group, LLP

(57) ABSTRACT

One embodiment of the present invention sets forth a technique for reducing flicker in image frames captured with a rolling shutter. A flicker detection and correction engine selects a first channel from a first image frame for processing. The flicker detection and correction engine subtracts each pixel value in the first channel from a corresponding pixel value in a prior image frame to generate a difference image frame. The flicker detection and correction engine identifies a first alternating current (AC) component based on a discrete cosine transform (DCT) associated with the difference image frame. The flicker detection and correction engine reduces flicker that is present in the first image frame based on the first AC component. One advantage of the disclosed techniques is that the flicker resulting from fluctuating light sources is correctly detected and reduced or eliminated irrespective of the frequency of the fluctuating light source.

20 Claims, 12 Drawing Sheets

DCT BASED FLICKER DETECTION

BACKGROUND OF THE INVENTION

1. Field of the Invention

Embodiments of the present invention generally relate to digital camera processing and, more specifically, to DCT-based flicker detection.

2. Description of the Related Art

Various handheld devices are widely available that provide the capability to capture photographs. These handheld devices include portable digital cameras as well as mobile devices with built-in cameras, such as smartphones and pad computers. These cameras typically employ a complementary metal-oxide-semiconductor (CMOS) sensors to capture light and convert the light into a digital signal that represents an image frame. Some cameras with CMOS sensors include a global shutter, where the entire CMOS sensor, corresponding to the entire image frame, is exposed at the same time. More typically, cameras with CMOS sensors include a rolling shutter, where a subset of rows of the CMOS sensor is exposed at any given time. An entire image frame is captured by dividing the image frame into multiple row subsets, and exposing each row subset for a specified duration. The row subsets are then blended together to compose the full image frame. This type of rolling shutter technique may improve sensitivity of the CMOS sensor, particularly under low-light conditions.

One drawback of the above rolling shutter technique is that, because the different row subsets are exposed at different moments in time, cameras with rolling shutters suffer from various spatial and temporal artifacts such as camera movement, subject movement, skew, smear, and wobble. One such artifact results from capturing an image frame under lighting conditions where the light intensity fluctuates over time, such as fluorescent lighting. When capturing an image frame under a fluctuating light source, one row subset may accumulate a relatively high amount of light from the light source, while another row subset may accumulate a relatively low amount of light from the light source. Consequently, a series of light and dark bands may appear in the final image, even though each row subset is exposed for the same duration. Such an artifact may be referred to as flicker.

One possible solution to the above issue is to match the pattern of the light and dark bands at known frequencies used by fluctuating light sources, such as 50 Hz and 60 Hz. A flicker detecting unit in the camera determines if light and dark bands are present in the image. If light and dark bands exist in the image, the flicker detection unit attempts to match the bands to either 50 Hz or a 60 Hz. A flicker correction unit then removes the bands based on a detected frequency of either 50 Hz or 60 Hz. One drawback of this possible solution is that not all fluctuating light sources alternate at a 50 Hz or 60 Hz frequency, and are not detectable by the flicker detection unit. In addition, traditional flicker detection approaches yield an unacceptably high quantity of false detections and missed detections. As a result, some light and dark band artifacts are not corrected, while images that do not indicate light and dark bands are improperly corrected, leading to poor image quality.

As the foregoing illustrates, what is needed in the art is a more effective way to capture images with rolling shutter cameras under fluctuating lighting conditions.

SUMMARY OF THE INVENTION

One embodiment of the present invention sets forth a method for reducing flicker in image frames captured with a rolling shutter. The method includes selecting a first channel from a first image frame for processing. The method further includes subtracting each pixel value in the first channel from a corresponding pixel value in a prior image frame to generate a difference image frame. The method further includes identifying a first alternating current (AC) component based on a discrete cosine transform (DCT) associated with the difference image frame. Finally, the method includes reducing flicker that is present in the first image frame based on the first AC component.

Other embodiments include, without limitation, a computer-readable storage medium that includes instructions that enable a processing unit to implement one or more aspects of the present invention and a computing device configured to implement one or more aspects of the present invention.

One advantage of the disclosed techniques is that the flicker resulting from fluctuating light sources is correctly detected and reduced or eliminated irrespective of the frequency of the fluctuating light source. Flicker correction is achievable in captured images whether or not the flicker is produced by 50 Hz or 60 Hz light sources.

BRIEF DESCRIPTION OF THE DRAWINGS

So that the manner in which the above recited features of the invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the present invention. However, it will be apparent to one of skill in the art that the present invention may be practiced without one or more of these specific details.

System Overview

Figure 1:
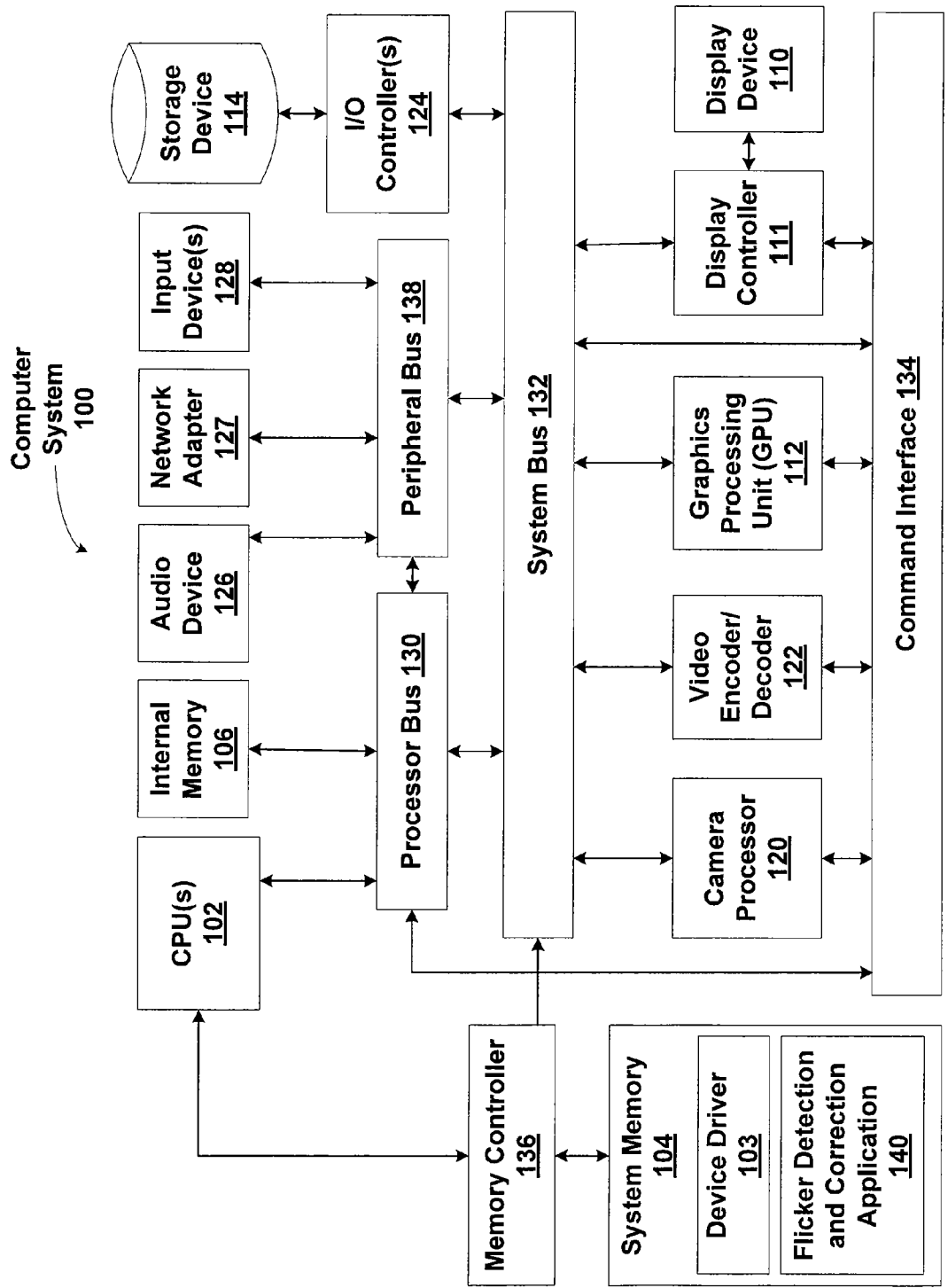
FIG. 1 is a block diagram illustrating a computer system configured to implement one or more aspects of the present invention.

FIG. 1 is a block diagram illustrating a computer system 100 configured to implement one or more aspects of the present invention. As shown, computer system 100 includes, without limitation, one or more central processing units (CPUs) 102 coupled to a system memory 104 via a memory controller 136. The CPU(s) 102 may further be coupled to internal memory 106 via a processor bus 130. The internal memory 106 may include internal read-only memory (IROM) and/or internal random access memory (IRAM). Computer system 100 further includes a processor bus 130, a system bus 132, a command interface 134, and a peripheral bus 138. System bus 132 is coupled to a camera processor 120, video encoder/decoder 122, graphics processing unit (GPU) 112, display controller 111, processor bus 130, memory controller 136, and peripheral bus 138. System bus 132 is further coupled to a storage device 114 via an I/O controller 124. Peripheral bus 138 is coupled to audio device 126, network adapter 127, and input device(s) 128.

In operation, the CPU(s) 102 are configured to transmit and receive memory traffic via the memory controller 136. The CPU(s) 102 are also configured to transmit and receive I/O traffic and communicate with devices connected to the system bus 132, command interface 134, and peripheral bus 138 via the processor bus 130. For example, the CPU(s) 102 may write commands directly to devices via the processor bus 130. Additionally, the CPU(s) 102 may write command buffers to system memory 104. The command interface 134 may then read the command buffers from system memory 104 and write the commands to the devices (e.g., camera processor 120, GPU 112, etc.). The command interface 134 may further provide synchronization for devices to which it is coupled.

The system bus 132 includes a high-bandwidth bus to which direct-memory clients may be coupled. For example, I/O controller(s) 124 coupled to the system bus 132 may include high-bandwidth clients such as Universal Serial Bus (USB) 2.0/3.0 controllers, flash memory controllers, and the like. The system bus 132 also may be coupled to middle-tier clients. For example, the I/O controller(s) 124 may include middle-tier clients such as USB 1.x controllers, multi-media card controllers, Mobile Industry Processor Interface (MIPI®) controllers, universal asynchronous receiver/transmitter (UART) controllers, and the like. As shown, the storage device 114 may be coupled to the system bus 132 via I/O controller 124. The storage device 114 may be configured to store content and applications and data for use by CPU(s) 102, GPU 112, camera processor 120, etc. As a general matter, storage device 114 provides non-volatile storage for applications and data and may include fixed or removable hard disk drives, flash memory devices, and CD-ROM (compact disc read-only-memory), DVD-ROM (digital versatile disc-ROM), Blu-ray, or other magnetic, optical, or solid state storage devices.

The peripheral bus 138 may be coupled to low-bandwidth clients. For example, the input device(s) 128 coupled to the peripheral bus 138 may include touch screen devices, keyboard devices, sensor devices, etc. that are configured to receive information (e.g., user input information, location information, orientation information, etc.). The input device(s) 128 may be coupled to the peripheral bus 138 via a serial peripheral interface (SPI), inter-integrated circuit (I2C), and the like.

In various embodiments, system bus 132 may include an AMBA High-performance Bus (AHB), and peripheral bus 138 may include an Advanced Peripheral Bus (APB). Additionally, in other embodiments, any device described above may be coupled to either of the system bus 132 or peripheral bus 138, depending on the bandwidth requirements, latency requirements, etc. of the device. For example, multi-media card controllers may be coupled to the peripheral bus 138.

A camera (not shown) may be coupled to the camera processor 120. The camera processor 120 includes an interface, such as a MIPI® camera serial interface (CSI). The camera processor 120 may further include an encoder preprocessor (EPP) and an image signal processor (ISP) configured to process images received from the camera. The camera processor 120 may further be configured to forward processed and/or unprocessed images to the display controller 111 via the system bus 132. In addition, the system bus 132 and/or the command interface 134 may be configured to receive information, such as synchronization signals, from the display controller 111 and forward the information to the camera.

In some embodiments, GPU 112 is part of a graphics subsystem that renders pixels for a display device 110 that may be any conventional cathode ray tube, liquid crystal display, light-emitting diode display, or the like. In such embodiments, the GPU 112 and/or display controller 111 incorporates circuitry optimized for graphics and video processing, including, for example, video output circuitry such as a high-definition multimedia interface (HDMI) controller, a MIPI® display serial interface (DSI) controller, and the like. In other embodiments, the GPU 112 incorporates circuitry optimized for general purpose and/or compute processing. Such circuitry may be incorporated across one or more general processing clusters (GPCs) included within GPU 112 that are configured to perform such general purpose and/or compute operations. System memory 104 includes at least one device driver 103 configured to manage the processing operations of the GPU 112. System memory 104 also includes a flicker detection and correction application 140 with modules configured to execute on a flicker detection and correction engine, as further described herein. The flicker detection and correction engine, when executing the a flicker detection and correction application 140, receives a series of image frames from the camera. One or more flicker bars at specific frequencies are identified, where each flicker bar is associated with a fluctuating light source that illuminates the scene captured by the camera. For each identified flicker bar, a visibility value and a confidence value are calculated. The adjusting the exposure time of the camera is adjusted to reduce or eliminate the flicker bars.

In various embodiments, GPU 112 may be integrated with one or more of the other elements of FIG. 1 to form a single hardware block For example, GPU 112 may be integrated with the display controller 111, camera processor 120, video encoder/decoder, audio device 126, and/or other connection circuitry included in the computer system 100.

It will be appreciated that the system shown herein is illustrative and that variations and modifications are possible. The connection topology, including the number and arrangement of buses, the number of CPUs 102, and the number of GPUs 112, may be modified as desired. For example, the system may implement multiple GPUs 112 having different numbers of processing cores, different architectures, and/or different amounts of memory. In implementations where multiple GPUs 112 are present, those GPUs may be operated in parallel to process data at a higher throughput than is possible with a single GPU 112. Systems incorporating one or more GPUs 112 may be implemented in a variety of configurations and form factors, including, without limitation, desktops, laptops, handheld personal computers or other handheld devices, servers, workstations, game consoles, embedded systems, and the like. In some embodiments, the CPUs 102 may include one or more high-performance cores and one or more low-power cores. In addition, the CPUs 102 may include a dedicated boot processor that communicates with internal memory 106 to retrieve and execute boot code when the computer system 100 is powered on or resumed from a low-power mode. The boot processor may also perform low-power audio operations, video processing, math functions, system management operations, etc.

In various embodiments, the computer system 100 may be implemented as a system on chip (SoC). In some embodiments, CPU(s) 102 may be connected to the system bus 132 and/or the peripheral bus 138 via one or more switches or bridges (not shown). In still other embodiments, the system bus 132 and the peripheral bus 138 may be integrated into a single bus instead of existing as one or more discrete buses. Lastly, in certain embodiments, one or more components shown in FIG. 1 may not be present. For example, I/O controller(s) 124 may be eliminated, and the storage device 114 may be a managed storage device that connects directly to the system bus 132. Again, the foregoing is simply one example modification that may be made to computer system 100. Other aspects and elements may be added to or removed from computer system 100 in various implementations, and persons skilled in the art will understand that the description of FIG. 1 is exemplary in nature and is not intended in any way to limit the scope of the present invention.

Figure 2:
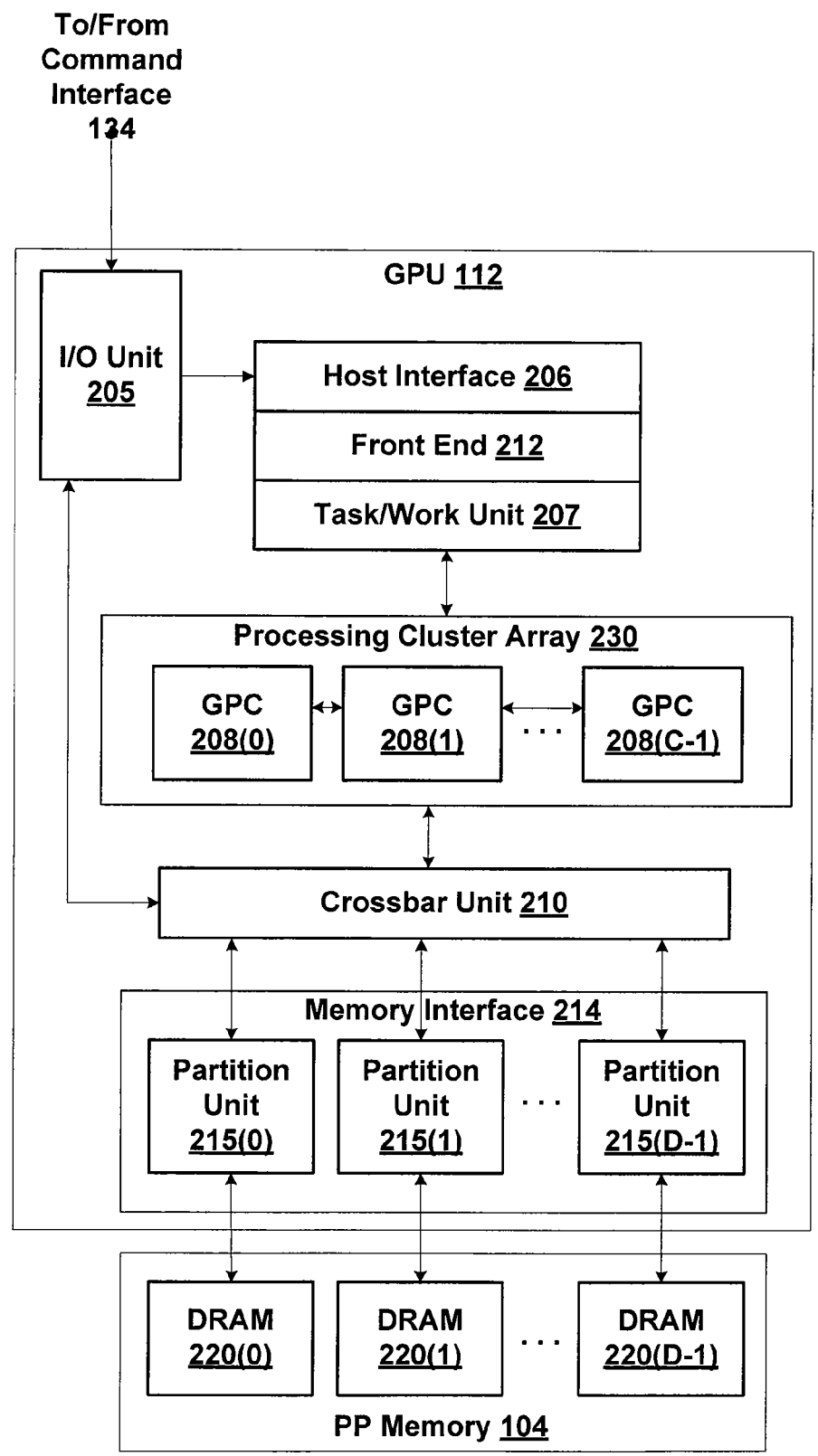
FIG. 2 is a block diagram of the GPU 112 of FIG. 1, according to one embodiment of the present invention.

FIG. 2 is a block diagram of the GPU 112 of FIG. 1, according to one embodiment of the present invention. Although FIG. 2 depicts one GPU 112 having a particular architecture, any technically feasible GPU architecture falls within the scope of the present invention. Further, as indicated above, the computer system 100 may include any number of GPUs 112 having similar or different architectures. GPU 112 may be implemented using one or more integrated circuit devices, such as one or more programmable processor cores, application specific integrated circuits (ASICs), or memory devices. In implementations where system 100 comprises an SoC, GPU 112 may be integrated within that SoC architecture or in any other technically feasible fashion.

In some embodiments, GPU 112 may be configured to implement a two-dimensional (2D) and/or three-dimensional (3D) graphics rendering pipeline to perform various operations related to generating pixel data based on graphics data supplied by CPU(s) 102 and/or system memory 104. In other embodiments, 2D graphics rendering and 3D graphics rendering are performed by separate GPUs 112. When processing graphics data, one or more DRAMs 220 within system memory 104 can be used as graphics memory that stores one or more conventional frame buffers and, if needed, one or more other render targets as well. Among other things, the DRAMs 220 within system memory 104 may be used to store and update pixel data and deliver final pixel data or display frames to display device 110 for display. In some embodiments, GPU 112 also may be configured for general-purpose processing and compute operations.

In operation, the CPU(s) 102 are the master processor(s) of computer system 100, controlling and coordinating operations of other system components. In particular, the CPU(s) 102 issue commands that control the operation of GPU 112. In some embodiments, the CPU(s) 102 write streams of commands for GPU 112 to a data structure (not explicitly shown in either FIG. 1 or FIG. 2) that may be located in system memory 104 or another storage location accessible to both CPU 102 and GPU 112. A pointer to the data structure is written to a pushbuffer to initiate processing of the stream of commands in the data structure. The GPU 112 reads command streams from the pushbuffer and then executes commands asynchronously relative to the operation of CPU 102. In embodiments where multiple pushbuffers are generated, execution priorities may be specified for each pushbuffer by an application program via device driver 103 to control scheduling of the different pushbuffers.

As also shown, GPU 112 includes an I/O (input/output) unit 205 that communicates with the rest of computer system 100 via the command interface 134 and system bus 132. I/O unit 205 generates packets (or other signals) for transmission via command interface 134 and/or system bus 132 and also receives incoming packets (or other signals) from command interface 134 and/or system bus 132, directing the incoming packets to appropriate components of GPU 112. For example, commands related to processing tasks may be directed to a host interface 206, while commands related to memory operations (e.g., reading from or writing to system memory 104) may be directed to a crossbar unit 210. Host interface 206 reads each pushbuffer and transmits the command stream stored in the pushbuffer to a front end 212.

As mentioned above in conjunction with FIG. 1, how GPU 112 is connected to or integrated with the rest of computer system 100 may vary. For example, GPU 112 can be integrated within a single-chip architecture via a bus and/or bridge, such as system bus 132. In other implementations, GPU 112 may be included on an add-in card that can be inserted into an expansion slot of computer system 100.

During operation, in some embodiments, front end 212 transmits processing tasks received from host interface 206 to a work distribution unit (not shown) within task/work unit 207. The work distribution unit receives pointers to processing tasks that are encoded as task metadata (TMD) and stored in memory. The pointers to TMDs are included in a command stream that is stored as a pushbuffer and received by the front end unit 212 from the host interface 206. Processing tasks that may be encoded as TMDs include indices associated with the data to be processed as well as state parameters and commands that define how the data is to be processed. For example, the state parameters and commands could define the program to be executed on the data. The task/work unit 207 receives tasks from the front end 212 and ensures that GPCs 208 are configured to a valid state before the processing task specified by each one of the TMDs is initiated. A priority may be specified for each TMD that is used to schedule the execution of the processing task. Processing tasks also may be received from the processing cluster array 230. Optionally, the TMD may include a parameter that controls whether the TMD is added to the head or the tail of a list of processing tasks (or to a list of pointers to the processing tasks), thereby providing another level of control over execution priority.

In various embodiments, GPU 112 advantageously implements a highly parallel processing architecture based on a processing cluster array 230 that includes a set of C general processing clusters (GPCs) 208, where $C \geq 1$. Each GPC 208 is capable of executing a large number (e.g., hundreds or thousands) of threads concurrently, where each thread is an instance of a program. In various applications, different GPCs 208 may be allocated for processing different types of programs or for performing different types of computations. The allocation of GPCs 208 may vary depending on the workload arising for each type of program or computation.

Memory interface 214 may include a set of D of partition units 215, where $D \geq 1$. Each partition unit 215 is coupled to the one or more dynamic random access memories (DRAMs) 220 residing within system memory 104. In one embodiment, the number of partition units 215 equals the number of DRAMs 220, and each partition unit 215 is coupled to a different DRAM 220. In other embodiments, the number of partition units 215 may be different than the number of DRAMs 220. Persons of ordinary skill in the art will appreciate that a DRAM 220 may be replaced with any other technically suitable storage device. As previously indicated herein, in operation, various render targets, such as texture maps and frame buffers, may be stored across DRAMs 220, allowing partition units 215 to write portions of each render target in parallel to efficiently use the available bandwidth of system memory 104.

A given GPC 208 may process data to be written to any of the DRAMs 220 within system memory 104. Crossbar unit 210 is configured to route the output of each GPC 208 to any other GPC 208 for further processing. Further GPCs 208 are configured to communicate via crossbar unit 210 to read data from or write data to different DRAMs 220 within system memory 104. In one embodiment, crossbar unit 210 has a connection to I/O unit 205, in addition to a connection to system memory 104, thereby enabling the processing cores within the different GPCs 208 to communicate with system memory 104 or other memory not local to GPU 112. In the embodiment of FIG. 2, crossbar unit 210 is directly connected with I/O unit 205. In various embodiments, crossbar unit 210 may use virtual channels to separate traffic streams between the GPCs 208 and partition units 215.

Although not shown in FIG. 2, persons skilled in the art will understand that each partition unit 215 within memory interface 214 has an associated memory controller (or similar logic) that manages the interactions between GPU 112 and the different DRAMs 220 within system memory 104. In particular, these memory controllers coordinate how data processed by the GPCs 208 is written to or read from the different DRAMs 220. The memory controllers may be implemented in different ways in different embodiments. For example, in one embodiment, each partition unit 215 within memory interface 214 may include an associated memory controller. In other embodiments, the memory controllers and related functional aspects of the respective partition units 215 may be implemented as part of memory controller 136. In yet other embodiments, the functionality of the memory controllers may be distributed between the partition units 215 within memory interface 214 and memory controller 136.

In addition, in certain embodiments that implement virtual memory, CPUs 102 and GPU(s) 112 have separate memory management units and separate page tables. In such embodiments, arbitration logic is configured to arbitrate memory access requests across the DRAMs 220 to provide access to the DRAMs 220 to both the CPUs 102 and the GPU(s) 112. In other embodiments, CPUs 102 and GPU(s) 112 may share one or more memory management units and one or more page tables.

Again, GPCs 208 can be programmed to execute processing tasks relating to a wide variety of applications, including, without limitation, linear and nonlinear data transforms, filtering of video and/or audio data, modeling operations (e.g., applying laws of physics to determine position, velocity and other attributes of objects), image rendering operations (e.g., tessellation shader, vertex shader, geometry shader, and/or pixel/fragment shader programs), general compute operations, etc. In operation, GPU 112 is configured to transfer data from system memory 104, process the data, and write result data back to system memory 104. The result data may then be accessed by other system components, including CPU 102, another GPU 112, or another processor, controller, etc. within computer system 100.

DCT-Based Flicker Detection

Figure 3:
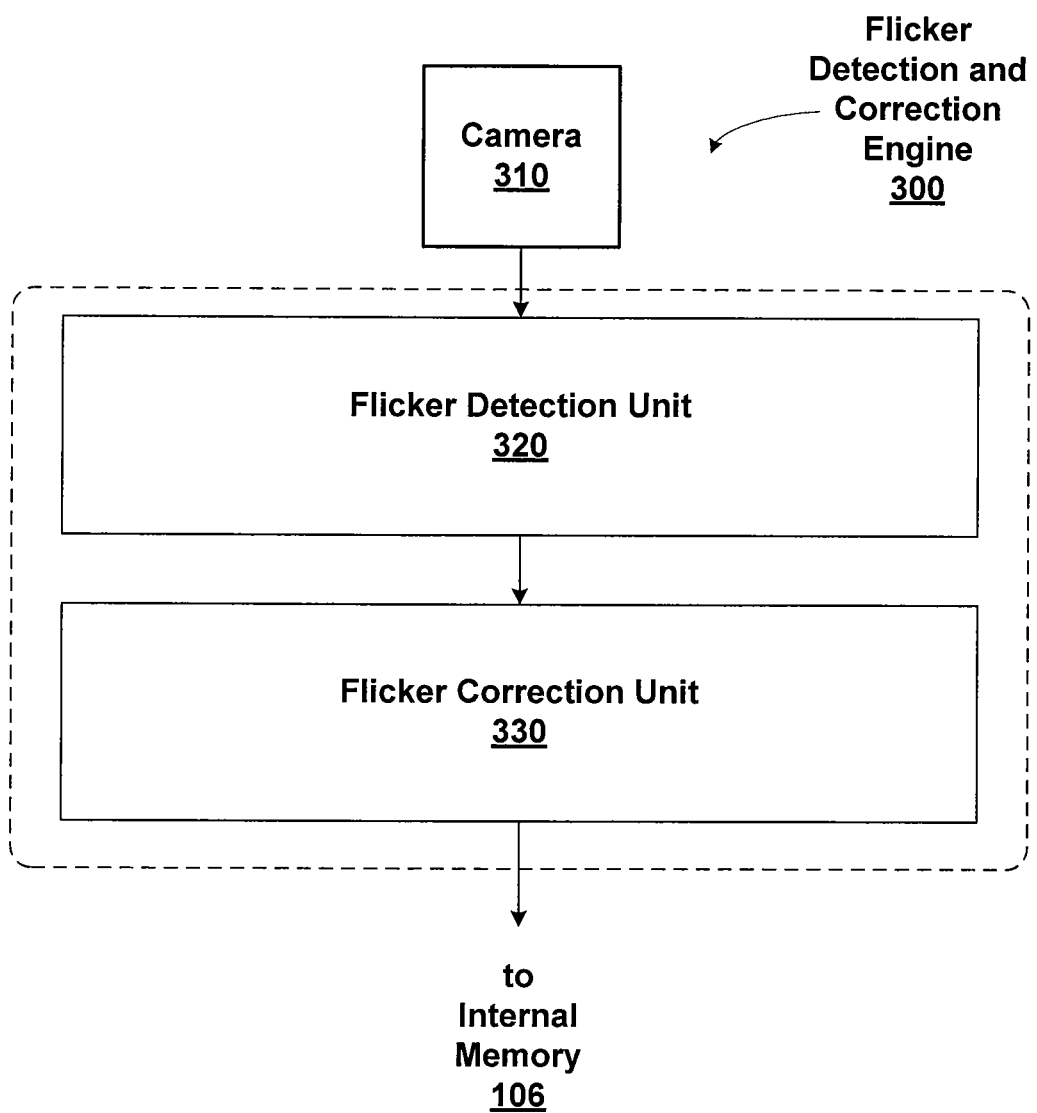
FIG. 3 is a block diagram of a flicker detection and correction engine 300, according to one embodiment of the present invention.

FIG. 3 is a block diagram of a flicker detection and correction engine 300, according to one embodiment of the present invention. As shown, the flicker detection and correction engine 300 includes a camera 310, a flicker detection unit 320, and a flicker correction unit 330. The flicker detection unit 320 and the flicker correction unit 330 may be implemented in the camera processor 120 of FIG. 1. Alternatively, the flicker detection unit 320 and the flicker correction unit 330 may be implemented in any technically feasible processing unit, including, without limitation, the CPU 102, or the GPU 112. The camera processor 120, CPU 102, GPU 112, or other processing unit, as the case may be, may implement the flicker detection unit 320 and the flicker correction unit 330 by executing various modules within the flicker detection and correction application 140.

In operation, the camera 310 acquires light via a front-facing or back facing lens and converts the acquired light into one or more analog or digital images for processing by other stages in the flicker detection and correction engine 300. The camera 310 may include any of a variety of optical sensors including, without limitation, complementary metal-oxide-semiconductor (CMOS) or charge-coupled device (CCD) sensors. The camera 310 may include functionality to determine and configure optical properties and settings including, without limitation, focus, exposure, color or white balance, and area of interest identification. The camera 310 may acquire images using a rolling shutter mechanism, whereby an image frame is captured by acquiring light over one subset of rows at a given time, and combining the row subsets to form an entire image frame. The camera 310 transmits acquired image frames to the flicker detection unit 320.

The flicker detection unit 320 receives acquired image frames from the camera 310 and determines whether flicker is present in the received image frames. The flicker detection unit first selects a channel of the input image frame to analyze for the presence of flicker bands, where a channel is one of the components of the image frame, including, without limitation, a luminance channel, a color channel, and a color difference channel. If the image frame is in YUV format, where Y represents the luminance of the image frame and U and V represent color difference information, then the flicker detection unit 320 typically selects the Y, or luminance, channel for processing. If the image frame is in RGB format, where R, G, and B represent the red, green, and blue channels of the image frame, respectively, then the flicker detection unit 320 typically selects either the red, the green, or the blue channel for processing. Alternatively, the flicker detection unit 320 may select any suitable channel of any technically feasible image format for processing.

The flicker detection unit 320 captures and stores data associated with the selected channel over multiple image frames. The flicker detection unit 320 downscales the image frames to a lower resolution to reduce processing time for flicker detection. For example, the flicker detection unit 320 could store multiple frames of luminance data over multiple input image frames, and downscale each image frame to 64 rows of 64 pixels each. The flicker detection unit 320 selects the time difference between consecutive input image frames in order to maximize the amplitude of flicker bands, in order to improve the likelihood of properly detecting the flicker.

The flicker detection unit 320 then subtracts the selected channel information, pixel-by-pixel, from two selected stored image frames to generate a difference image frame. The two stored image frames selected for subtraction may be consecutive image frames. Alternatively, the two stored image frames selected for subtraction may be any two image frames where the time difference between the two selected frames is likely to result in maximal amplitude of the flicker bands. After subtracting the two selected input frames, the flicker detection unit 320 performs an operation on each row of pixels in the difference image frame. For example, if the difference image frame is 64 rows by 64 pixels, the flicker detection unit 320 could compute the sum of the 64 pixels in each row, resulting in 64 values, where each value is the sum of the pixel data for one of the 64 rows. Alternatively, the flicker detection unit 320 could scale each of the row sums to smaller values, such as by scaling 16-bit sums into 12-bit values, resulting in 64 values, where each value is the scaled sum of the pixel data for one of the 64 rows. Alternatively, the flicker detection unit 320 could compute the average pixel value over the 64 pixels in each row, resulting in 64 values, where each value is the average pixel value for one of the 64 rows. Note that computing the average pixel value over the 64 pixels in each row may be considered a special case of computing the scaled sum of the 64 pixels in each row. Alternatively, the flicker detection unit 320 could perform the sum, scaled sum, or average function on the downscaled image frames first, generating a 1×64 array for each stored image frame. The flicker detection unit 320 would then subtract the 1×64 arrays corresponding two selected image frames.

The flicker detection unit 320 then generates a one-dimensional (1D) discrete-cosine-transform (DCT) of the difference values. The DCT may have any suitable number of bins, such as 32 or 64 bins, where the first bin represents the direct current (DC) component of the difference values, and each successive bin represents the energy at a frequency that is a consecutive power of two. For example, the first bin could represent the DC component, the second bin could represent the energy at 2 Hz, the third bin could represent the energy at 4 Hz, the fourth bin could represent the energy at 8 Hz, and so on.

The flicker detection unit 320 applies a temporal smoothing function to the DCT data to reduce temporal noise that may appear in the DCT data. For example, the flicker detection unit 320 could average the DCT data over some number of image frames, such as ten image frames. The flicker detection unit 320 applies a spatial smoothing function to the temporally smoothed DCT data to amplify the height of frequency peaks that appear in the DCT data in order to improve detectability of flicker bands. For example, the flicker detection unit 320 a three position moving average to the DCT data, such that the final value at a given position of the DCT data is the average of the original value at that position and the original values at the two immediately adjacent positions.

The flicker detection unit 320 computes the dominant frequency of an identified alternating current (AC) component from the temporally and spatially smoothed DCT data. The flicker detection unit 320 first identifies the maximum peak position associated with the highest DCT value. Because the frequency of the fluctuating light source is typically not aligned precisely to the frequencies represented by the DCT positions, the flicker detection unit 320 selects an equal number of adjacent positions to the left and the right of the identified peak position, where the values at the adjacent positions are higher than the average DCT value. The flicker detection unit 320 computes a weighted sum of the peak position and the adjacent positions to determine the dominant frequency of the AC component representing the fluctuating light source. This dominant frequency may be computed as: dominant frequency=peak DCT position/(2× active region readout time). The active region readout time is the time taken by the sensor to integrate the rows of one image frame and is given by: active region readout time= (row length in pixels×sensor height in rows)/pixel clock frequency.

The flicker detection unit 320 then computes the position of the reference sine wave associated with the dominant frequency by comparing the detected dominant frequency based on the integration time of the entire image frame, which, in turn, is based on various factors, including, without limitation, image frame rate, image frame height versus rolling shutter height, and vertical blanking time.

The flicker detection unit 320 then repeats the frequency detection process for other dominant peaks in the DCT data that are within a threshold of the DCT value of the maximum peak position. For example, the flicker detection unit 320 could repeat the frequency detection process for AC components with an amplitude that is 60% or more of the amplitude of the AC component associated with the maximum peak position. Repeating the frequency detection process identifies multiple fluctuating light sources that may illuminate a scene, such as when a scene is illuminated by both a fluorescent light and a CRT display.

From the DCT data, the flicker detection unit 320 also computes two metrics for each identified AC component. A first metric generated by the flicker detection unit 320 represents the visibility of the flicker band, where a higher value indicates stronger flicker bands and a lower value indicates weaker flicker band. The visibility may be computed as a function of the amplitude and variance of the AC component. A second metric generated by the flicker detection unit 320 represents the confidence level of the flicker bands, where a higher value indicates a more reliable flicker detection, and a lower value indicates a less reliable flicker detection. For example, a lower confidence value could result from a scene change that occurred between the acquisition times represented by the two subtracted image frames. The confidence level may be computed as a function of the distance between the position of the AC component and the position of the reference since wave, as well as the amplitude of the AC component. The flicker detection unit 320 transmits the visibility, confidence, and flicker band frequency for each identified AC component, to the flicker correction unit 330, along with the input image frames.

The flicker correction unit 330 receives the visibility, confidence, flicker band frequencies, and the input image frames, from the flicker detection unit 330. The flicker correction unit 330 corrects flicker bands in the input image frames based on the visibility, confidence, and flicker band frequencies. In some embodiments, the flicker correction unit 330 may be integrated with an automatic-exposure (AE) unit (not shown), where the automatic-exposure unit controls the exposure time of the sensors in the camera. The flicker correction unit stores the corrected image frame in the internal memory 106, in a file on the storage device 114, or in any other technically feasible storage area.

The process by which the flicker detection unit 320 detects the presence of flicker bands by subtracting two selected input pixel-by-pixel is described below in conjunction with FIGS. 4A-4E.

FIGS. 4A-4E illustrate flicker bands detected by subtracting adjacent image frames, according to various embodiments of the present invention.

Figure 4A:
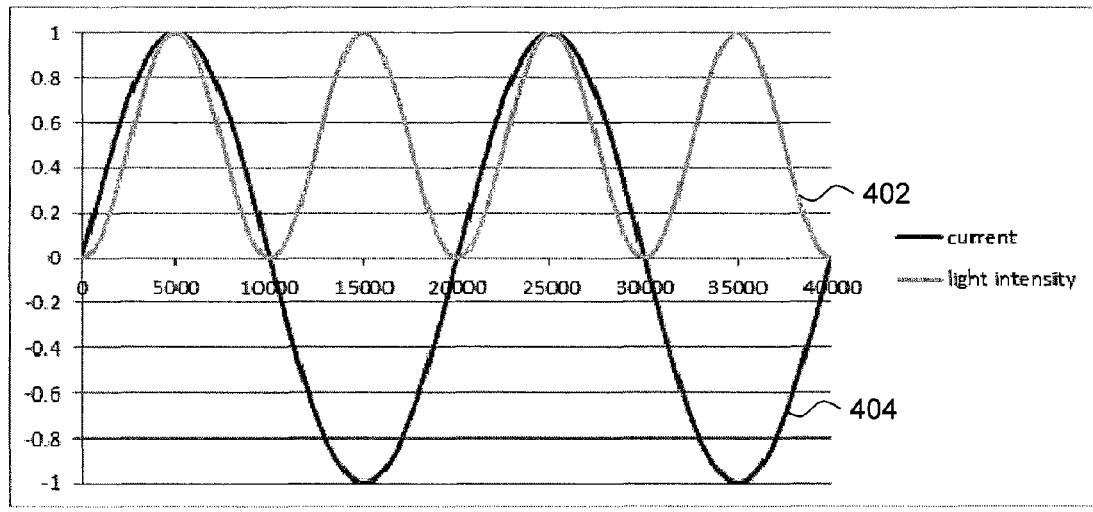
FIGS. 4A-4E illustrate flicker bands detected by subtracting adjacent image frames, according to various embodiments of the present invention.

As shown in FIG. 4A, the light intensity 402 of a fluctuating light source may be in the form of a sine wave that is directly proportional to the current 404 of the corresponding alternating current (AC) power source. In one embodiment, the frequency of the light intensity 402 may be twice that of the current 404. For example, if the AC power source is 50 Hz, then the light intensity would vary at a 100 Hz rate. Likewise, if the AC power source is 60 Hz, then the light intensity would vary at a 120 Hz rate. In another embodiment, the frequency of the light intensity 402 may be unrelated to the current 404. For example, if the AC power source is 60 Hz, then the light intensity could vary at a 2000 Hz rate.

Typically, alternating current that drives a fluctuating light source, such as a fluorescent lamp, is in the form of a sine wave. The variation of the alternating current may be described mathematically as a function of time by Equation 1 below:

$$c(t) = C \sin(2\pi f t) \quad (1)$$

where C is the peak current, and f is the frequency representing the number of cycles per second of the alternating current. The frequency of alternating current varies by country, but most typically is either 50 Hz or 60 Hz. The light intensity of a fluctuating light source, such as a fluorescent lamp, is directly proportional to the frequency of the current associated with the power source, which is, in turn, directly proportional to the square of the current as shown in Equation 2 below:

$$l(t) = P \sin^2(2\pi f t) \quad (2)$$

A substitution may be made to rewrite Equation 2 in the form shown in Equation 3 below:

$$l(t) = \frac{P}{2}(1 - \cos(4\pi f t)) \quad (3)$$

As indicated in Equation 3, the light intensity of the fluorescent lamps is also a sine wave but with a frequency that is twice the frequency of the current, as shown in FIG. 4A.

In a typical camera that includes a rolling shutter, pixels in the same row are exposed at the same time, while pixels in different rows are exposed at different times as the shutter rolls past each row. If the width of the rolling shutter window, also referred to as the exposure time, is given by E, and a given row of the image frame is exposed between time t and time t+E, then the accumulative light that is integrated by that row is given by Equation 4 below:

$$F(t) = \int_t^{t+E} l(T) dT \quad (4)$$

Substituting Equation (3) into Equation (4) yields Equation 5 below:

$$F(t) = \quad (5)$$
$$\int_t^{t+E} \frac{P}{2}(1 - \cos(4\pi f t)) dT = \frac{PE}{2} - \frac{P}{4\pi f}\sin(2\pi f E)\cos(4\pi f t + 2\pi f E)$$

As seen in Equation 5, the integrated light F(t) is represented by a sine wave with the same frequency as the light source itself, and twice the frequency of the alternating current. Differences in the integrated light F(t) caused by the rolling shutter result in flicker artifacts that appear as alternating dark and bright horizontal bands in the captured image frame. As time progresses, the time dependent term "$\cos(4\pi f t + 2\pi f E)$" in Equation 5 varies between −1 and 1. As a result, the integrated light F(t) varies between $$\frac{PE}{2} - \frac{P}{4\pi f}\sin(2\pi f E) \text{ and } \frac{PE}{2} + \frac{P}{4\pi f}\sin(2\pi f E).$$

An image frame row is darkest when the integrated light F(t) reaches the lowest point at $$\frac{PE}{2} - \frac{P}{4\pi f}\sin(2\pi f E)$$

and brightest when the integrated light F(t) reaches the highest point $$\frac{PE}{2} + \frac{P}{4\pi f}\sin(2\pi f E).$$

The visibility of the flicker bands V(E) is directly proportional to the difference between these two points, as shown in Equation 6 below:

$$V(E) = \quad (6)$$
$$\left(\frac{PE}{2} + \frac{F}{4\pi f}\sin(2\pi f E)\right) - \left(\frac{PE}{2} - \frac{P}{4\pi f}\sin(2\pi f E)\right) = \frac{P}{2\pi f}\sin(2\pi f E)$$

As indicated by Equation 6, the visibility of the flicker bands V(E) is a function of the exposure time E.

Figure 4B:
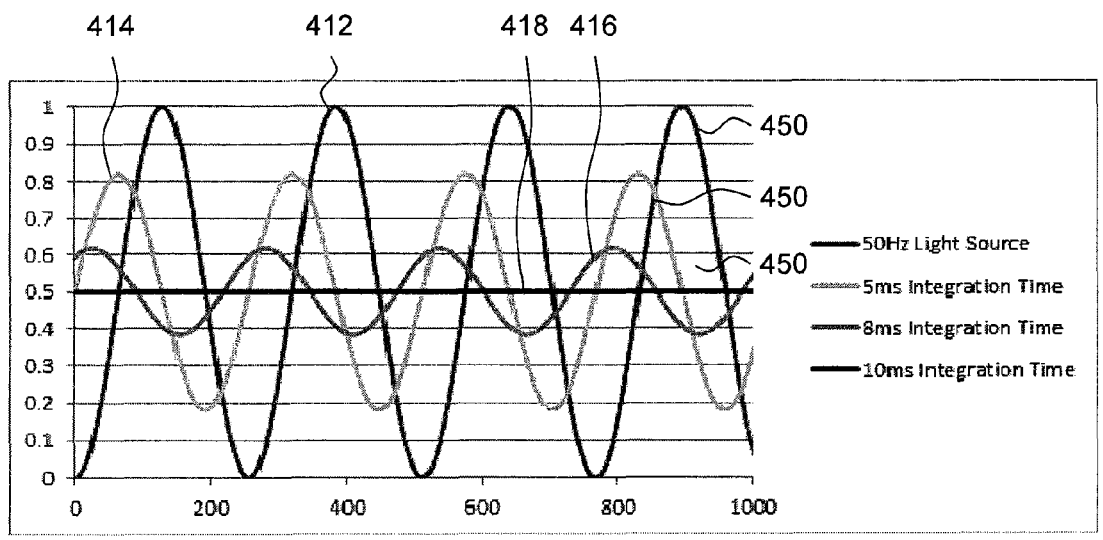

As shown in FIG. 4B, the visibility of the flicker bands V(E) varies by exposure time exposure time E. The light intensity 412 of a 50 Hz fluctuating light source is shown over approximately four cycles. For an exposure time E=5 ms, the flicker band visibility 414 has a relatively high amplitude. For an exposure time E=8 ms, the flicker band visibility 416 has a relatively lower amplitude. For an exposure time E=10 ms, the flicker band visibility 418 has zero amplitude. Consequently, flicker bands associated with a 50 Hz reduce to zero with an exposure time E=10 ms.

If the exposure time is a multiple of $$\frac{1}{2f}$$

(i.e.

$$E = \frac{n}{2f}$$

where n is a positive integer), then the visibility of the flicker bands V(E) may be given by Equation 7 below:

$$V(E) = \frac{p}{2\pi f}\sin(2\pi fE) = \frac{p}{2\pi f}\sin(n\pi) = 0 \qquad (7)$$

because $\sin(n\pi)=0$ for any positive integer n. As a result, if the exposure time E is a multiple of $$\frac{1}{2f},$$

then there are no visible flicker bands. Consequently, to eliminate flicker bands, the exposure time E is selected to be a multiple of $$\frac{1}{2f}.$$

To detect the flicker bands described above, values from two image frames are subtracted to create a difference image frame. By subtracting two image frames, rather than using a single image frame, the visual content of the image frame is removed or reduced, while the flicker bands remain. If the scene does not change significantly between the two captured image frames, the visual content is removed or reduced after the subtraction process. The flicker bands, by contrast, typically appear at different locations in the two image frames, because the capture of the two image frames may occur at a different point during the light source fluctuation. As a result, the two image frames have flicker bands at the same frequency, but at different vertical positions within the respective image frame. As a result, subtracting the two image frames yields a difference image frame that includes other flicker bands with the same characteristics as the flicker bands in the two original image frames. If the scene changes significantly between the two image frames, such as when the camera is rapidly panned or zoomed, the substantial difference of the visual contents of the scene mixes with the flicker bands, causing flicker detection to become more difficult. If such a scene change occurs, the flicker detection unit 320 may report the scene change such that any flicker detection results may be discounted or ignored by the flicker correction unit 330. One approach is to report a low confidence value when a scene change is detected, as further discussed herein.

As described above, subtracting two image frames that exhibit flicker bands yields a difference image frame with other corresponding flicker bands. If the light integration of the rolling shutter associated with the CMOS sensor is a sine wave, then the flicker bands are represent a sine wave. The location of the flicker bands in the captured image frame corresponds to the time that the light integration process begins for the image frame. The flicker bands may be expressed mathematically as $\sin(x+p)$, where p is the phase that reflects the actual location of the flicker band in the image frame. The subtraction of the flicker bands in two image frames may then be given by Equation 8 below:

$$A\sin(x+a) - A\sin(x+b) = 2A\sin\left(\frac{a-b}{2}\right)\cos\left(x+\frac{a+b}{2}\right) \qquad (8)$$

As indicated in Equation 8, the subtraction of the two flicker bands results in other flicker bands with the same frequency x, but with different phase $$\left(\frac{a+b}{2}\right)$$

and with different amplitude $$\left|2A\sin\left(\frac{a-b}{2}\right)\right|.$$

Figure 4C:
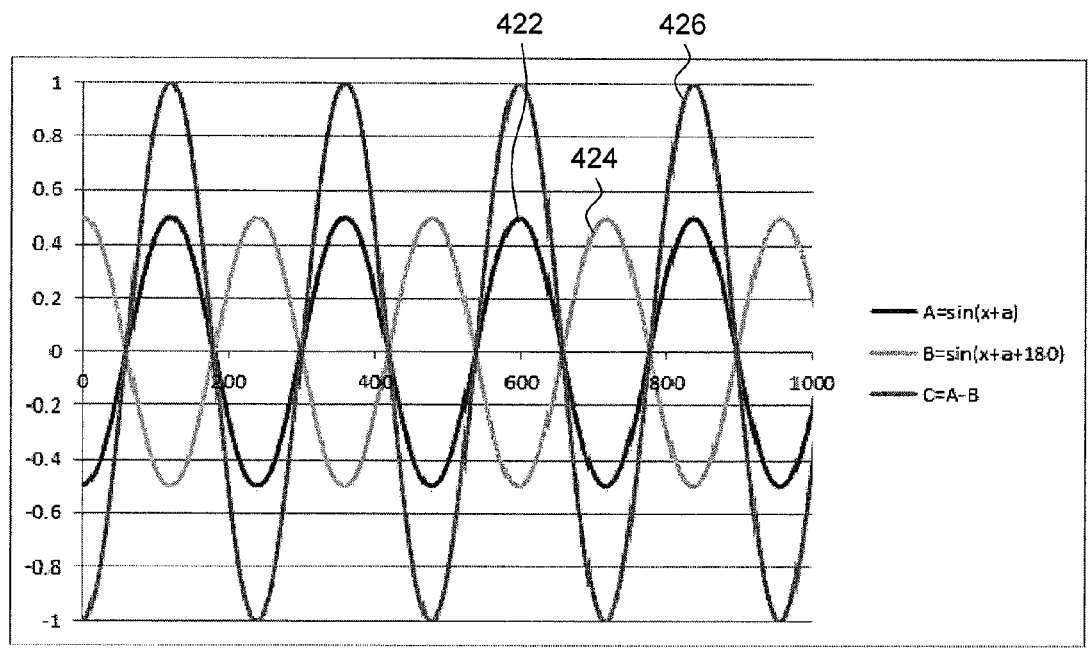

As shown in FIG. 4C, sine wave A 422 varies according to the equation $A=\sin(x+a)$, while sine wave B 424, which is out of phase from sine wave A 422 by 180°, varies according to the equation $B=\sin(x+a+180)$. Subtracting sine wave B 424 from sine wave A 422 yields sine wave C 426, where $C=A-B$. As can be seen, sine wave C 426 has a relatively high amplitude, and may be detected by the flicker detection unit 320 as a potential flicker band.

Figure 4D:
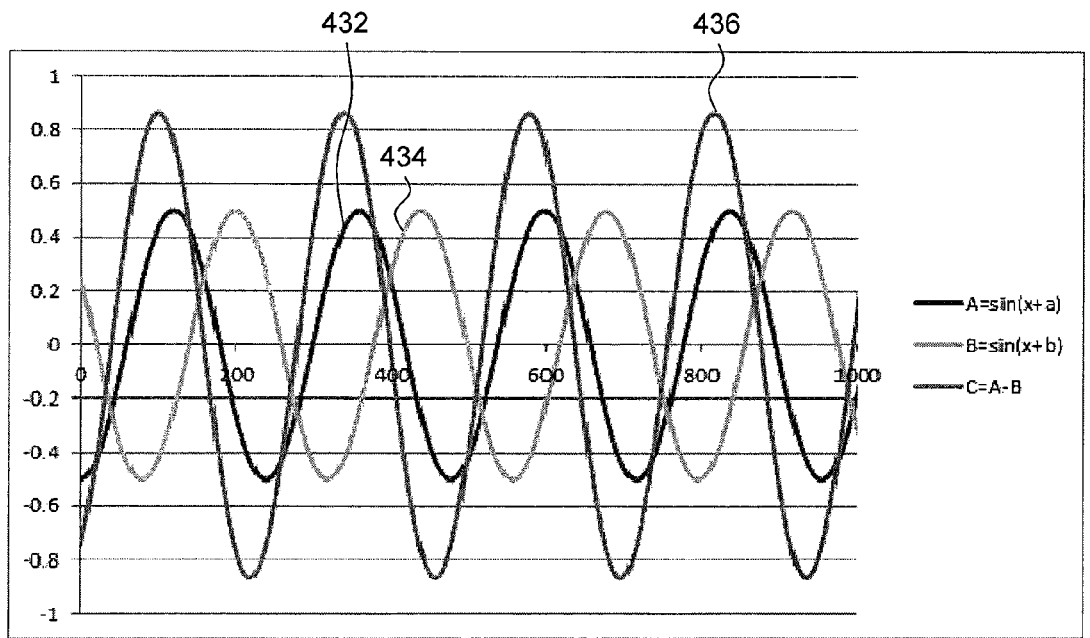

As shown in FIG. 4D, sine wave A 432 varies according to the equation $A=\sin(x+a)$, while sine wave B 434, which is slightly out of phase from sine wave A 432, varies according to the equation $B=\sin(x+b)$. Subtracting sine wave B 434 from sine wave A 432 yields sine wave C 436, where $C=A-B$. As can be seen, sine wave C 436 also has a relatively high amplitude, and may be detected by the flicker detection unit 320 as a potential flicker band.

Figure 4E:
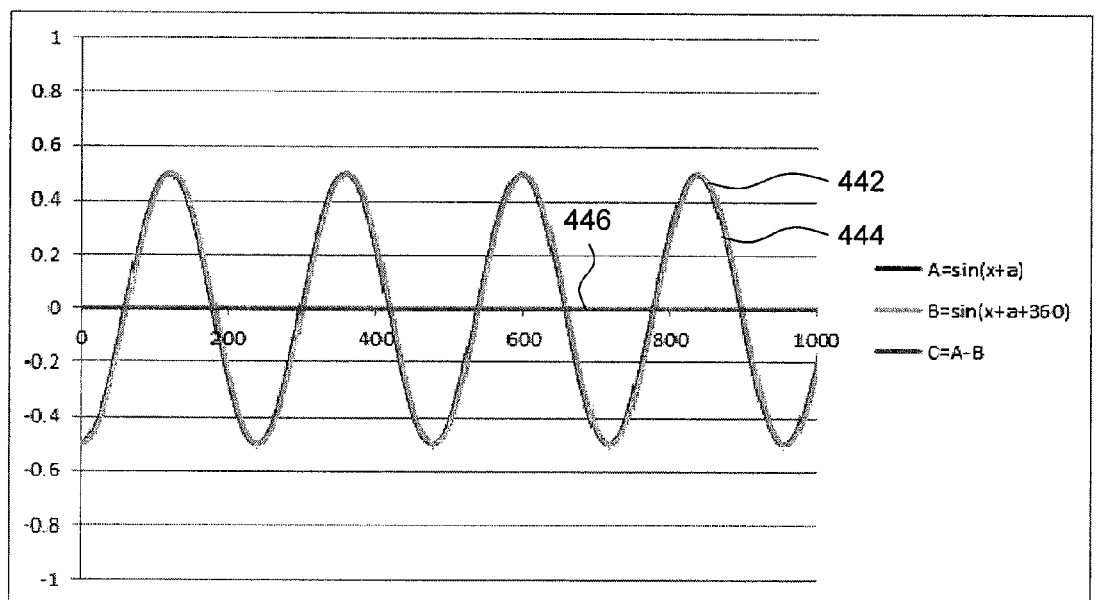

As shown in FIG. 4E, sine wave A 442 varies according to the equation $A=\sin(x+a)$, while sine wave B 444, which is out of phase from sine wave A 442 by 360°, varies according to the equation $B=\sin(x+a+360)$. Because a sine wave that is out of phase by 360° is indistinguishable from an in-phase sine wave, sine wave B 444 is indistinguishable from sine wave A 442. Subtracting sine wave B 444 from sine wave A 442 yields a flat signal C 446, where $C=A-B$. As can be seen, flat signal C 446 has an amplitude of zero, and may not be detected by the flicker detection unit 320 as a potential flicker band.

The new phase of the new flicker bands, resulting from the subtraction process, shifts the location of the bands, but the frequency of the new flicker bands remains unchanged. Consequently, flicker detection is not negatively affected by the subtraction process.

As seen from FIGS. 4C-4E, amplitude of the difference signal may be significantly impacted based on the phase difference between the two subtracted image frames. In other words, a difference image frame with a larger amplitude is more readily detected than a difference image frame with a smaller amplitude. The new amplitude of $$\left|2A\sin\left(\frac{a-b}{2}\right)\right|$$

the difference image frame depends on both the original amplitude of the two input image frames and the phase difference between the image frames. As discussed above, the original amplitude of the input image frames depends on the exposure time E, as employed by the flicker correction unit 330. Typically, the exposure time E is selected by the auto-exposure unit or the flicker correction unit 330, in order to optimize exposure and flicker correction. Consequently, the flicker detection circuit 320 may not be able to alter the exposure time E to increase the amplitude of the difference image frame without negatively impacting the auto-exposure unit or the flicker correction unit 330. However, the flicker detection circuit 320 may control the phase difference between the two input image frames to increase the amplitude of the difference image frame without negatively impacting the auto-exposure unit or the flicker correction unit 330.

Mathematically, the largest value of | sin(x)| is 1, which occurs at the point defined by Equation 9 below:

$$x = \frac{\pi}{2}(2n+1) \qquad (9)$$

where n is an integer. Accordingly, the new amplitude of the difference image frame $$\left|2A\sin\left(\frac{a-b}{2}\right)\right|$$

has a maximum value of 2A at the point defined according to Equation 10 below:

$$\frac{a-b}{2} = \frac{\pi}{2}(2n+1) \qquad (10)$$

where Equation 10 may be rewritten as Equation 11 below:

$$(a-b)=\pi(2n+1) \qquad (11)$$

Recasting Equation 11 into the time domain yields Equation 12 below:

$$\frac{1}{2F}(2n+1) \qquad (12)$$

where F is the flicker frequency of the light source, which is typically twice the frequency of the alternating current associated with the power source.

For example, given a 50 Hz light source, the optimum time difference between the two input image frames is $$\frac{1}{200}(2n+1).$$

In other words, the optimum time difference is an odd number multiple of 5 ns. Similarly, for the 60 Hz light source, the optimum time difference between the two input image frames is an odd number multiple of 4.1667 ns.

After computing the difference image frame, the flicker detection unit 320 sums or averages the pixel values for each row of the difference image frame and computes the 1D DCT, as described below in conjunction with FIGS. 5A-5F.

FIGS. 5A-5F illustrate flicker bands detected across a row subset of the image frame, according to various embodiments of the present invention.

After the flicker detection unit 320 subtracts the two input image frames to generate the difference image frame, the flicker detection unit 320 scales each input image frame into one value per row of pixels. For example, if each input frame is downsampled to 64 rows of 64 pixels each, the flicker detection unit 320 scales each input image frame into a 1×64 array, where each value in the 1×64 array represents a scaled value of a row of input pixels. The scaled value may result from summing the pixel values for each pixel in the given row. Alternatively, the scaled value may by the average of the pixel values for the pixels in the given row. The scaling process reduces each row of pixels to a single value. Because all pixels in the same row are exposed at the same time, the pixel values for a given row may be combined to reduce the amount of data to analyze, without reducing the accuracy of the detection. Downscaling image frames to 64 rows is generally sufficient to distinguish between flicker bands generated by 50 Hz and 60 Hz light sources. A different number of rows may be used to distinguish flicker bands generated by light sources that vary according to other frequencies.

Figure 5A:
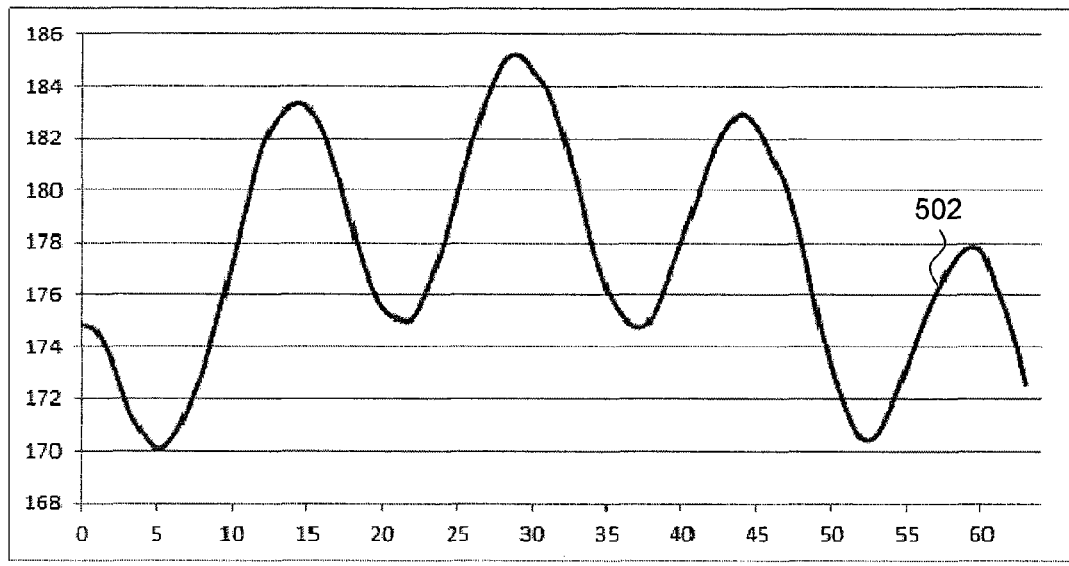
FIGS. 5A-5F illustrate flicker bands detected across a row subset of the image frame, according to various embodiments of the present invention.

As shown in FIG. 5A, the 64 scaled values exhibit a sinsusiodal pattern if flicker bands are present, as illustrated by waveform 502.

Figure 5B:
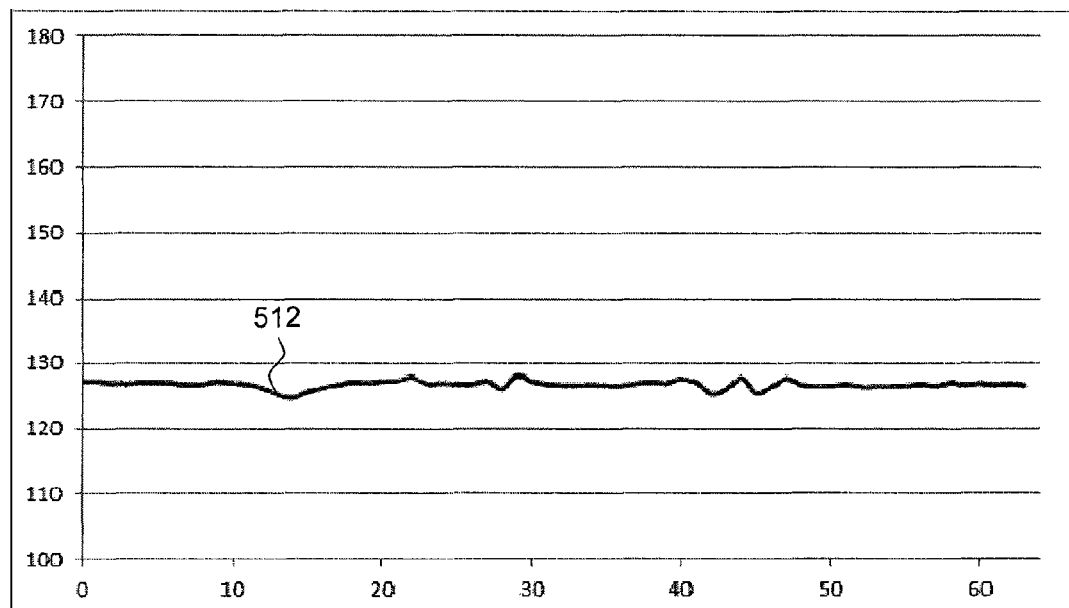

As shown in FIG. 5B, the 64 scaled values exhibit a relatively flat pattern if flicker bands are not present, as illustrated by waveform 512.

Figure 5C:
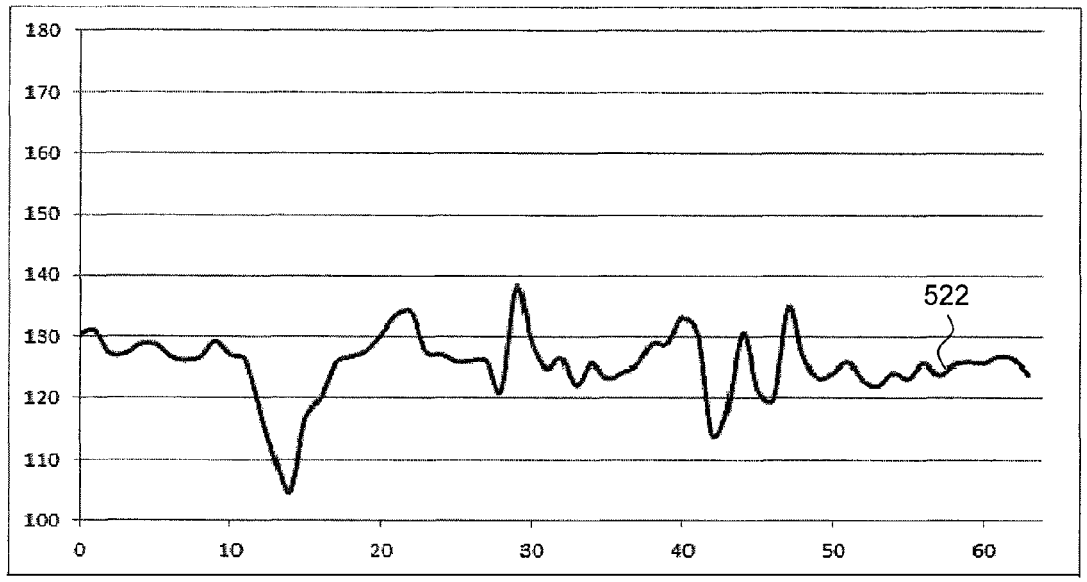

As shown in FIG. 5C, the 64 scaled values exhibit a pattern that is neither sinusoidal nor relatively flat if the scene changes significantly, as illustrated by waveform 522.

After the flicker detection unit 320 computes the 64 scaled values for the difference image frame, the flicker detection unit 320 then performs a 1D DCT on the set of scaled values to determine the AC components present in the difference image frame.

Figure 5D:
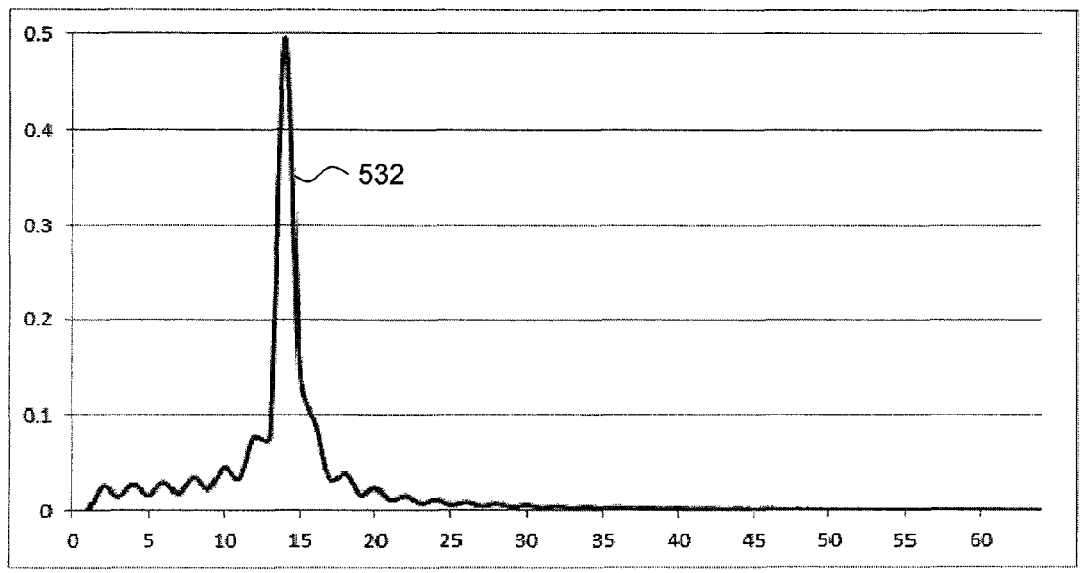

As shown in FIG. 5D, if flicker bands are present in the difference image frame, the DCT indicates a significant amplitude spike according to the frequency of the flicker band, as illustrated by waveform 532. Consequently, the flicker detection unit 320 may report a flicker band at the detected frequency with a relatively high confidence value.

Figure 5E:
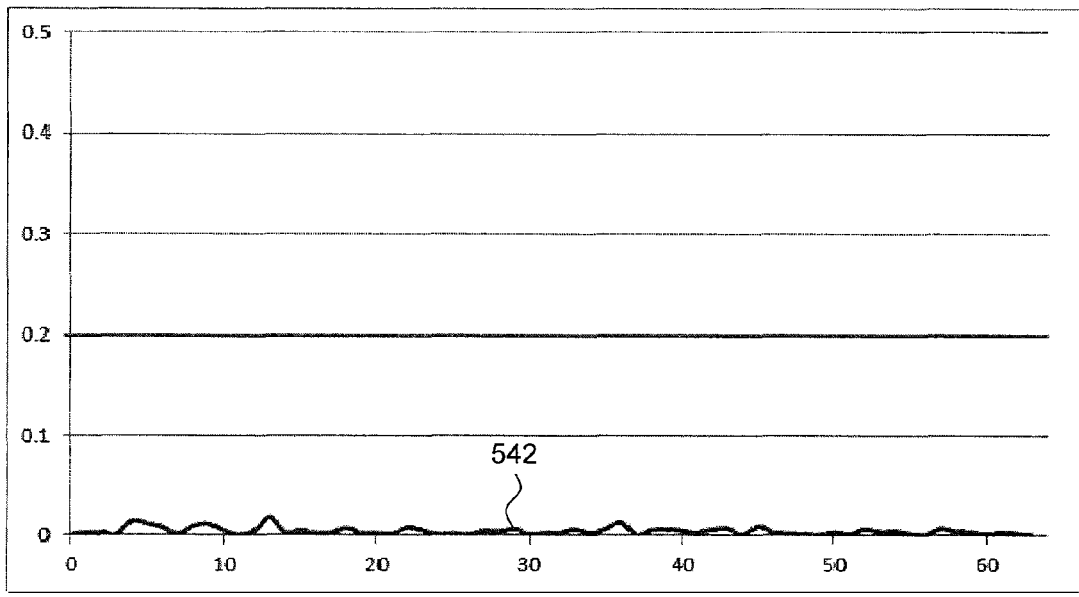

As shown in FIG. 5E, if flicker bands are not present in the difference image frame, the DCT indicates a relatively flat signal without a significant amplitude spike, as illustrated by waveform 542. Consequently, the flicker detection unit 320 may not report a flicker band.

Figure 5F:
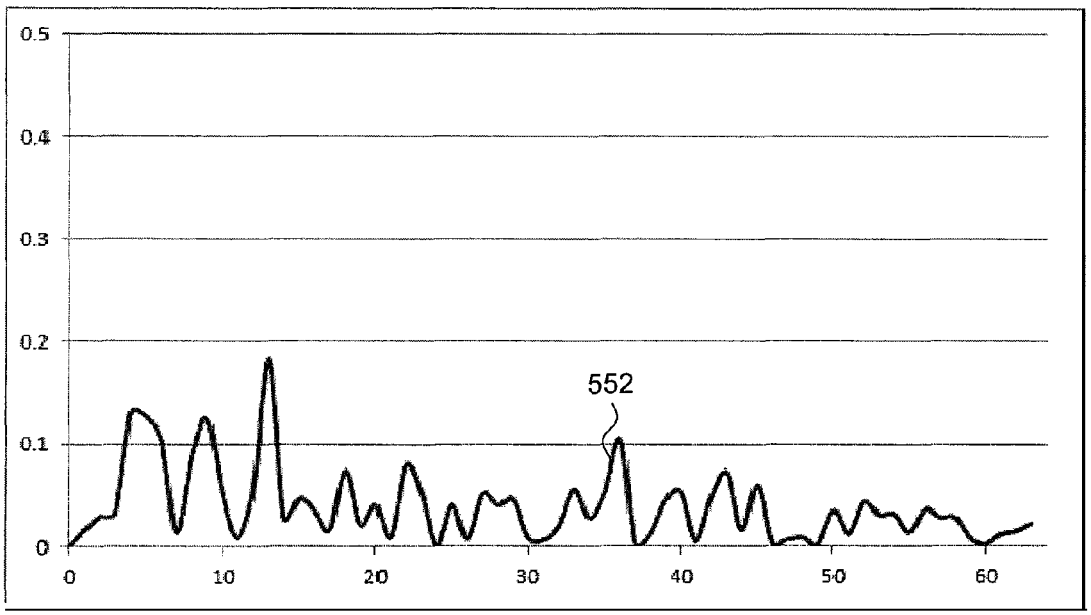

As shown in FIG. 5F, if a significant scene change occurs between the times of the two input image frames, then the DCT indicates neither a relatively flat signal nor a significant amplitude spike, as illustrated by waveform 552. Consequently, the flicker detection unit 320 may report a flicker band with a relatively low confidence value.

In the DCT data, as illustrated in FIGS. 5D-5F, the first position at the leftmost of the DCT data represents the direct current (DC) component, or the average brightness of the image frame. Accordingly, the flicker detection unit 320 ignores the DC component of the DCT data. The other positions of the DCT data include the AC components of different frequencies. Lower positions, toward the left of FIGS. 5D-5F, correspond to lower frequencies. Correspondingly, higher positions, toward the right of FIGS. 5D-5F, correspond to higher frequencies.

If the flicker bands are visible, as in FIG. 5D, the AC components peak around a single position in the DCT data (representing a single frequency), where the value at this single position, values at neighboring positions, are measurably higher than the values in the other positions. If no flicker bands are present, as in FIG. 5E, the AC components are approximately the same across the DCT data graph. During a scene change, as in FIG. 5F, the AC components may have multiple peaks, with values at any given position that are not measurably higher than values at other positions.

The flicker detection unit also computes a confidence level associated with the detected AC components corresponding to the flicker bands, as described below in conjunction with FIG. 6.

Figure 6:
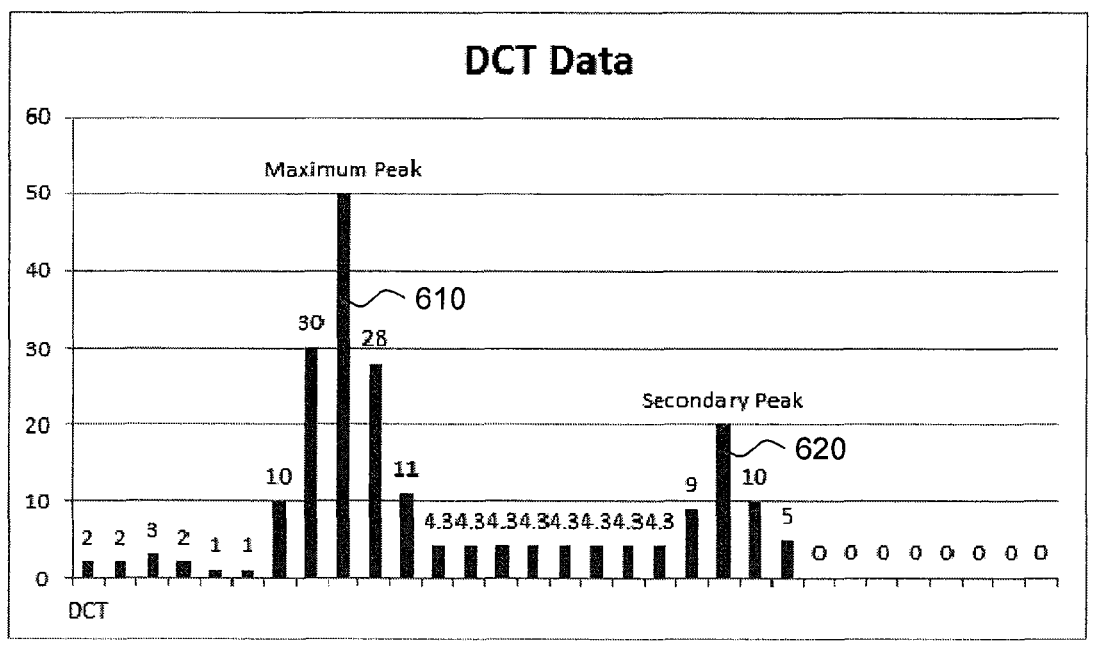
FIG. 6 illustrates discrete-cosine-transform (DCT) data as used to calculate a flicker detection confidence level, according to one embodiment of the present invention.

FIG. 6 illustrates DCT data 600 as used to calculate a flicker detection confidence level, according to one embodiment of the present invention. As shown, the DCT data 600 includes a maximum peak 610 and a secondary peak 620.

The maximum peak 610 is identified by determining the DCT position, other than the first position representing the DC component, with the highest value. Positions adjacent to the maximum peak 610 that have values that are higher than average are also selected as part of the AC component associated with the maximum peak 610. The maximum peak 610 and the selected neighboring positions are considered as a normal distribution, for which the mean $\mu_x$ and variance $\sigma_x$ are computed.

The secondary peak 620 is identified by determining the DCT position, other than the DC component and the positions associated with the maximum peak 610, with the highest value. The confidence value is then computed as: flicker confidence value=(1−maximum peak/secondary peak)/$\mu_x$. The resulting confidence value is then normalized. In some embodiments, if the computed mean $\mu_x$ varies from the maximum peak 610 by more than a threshold value, then the confidence value may be set to zero, indicating no confidence in the identified AC component.

Figure 7A:
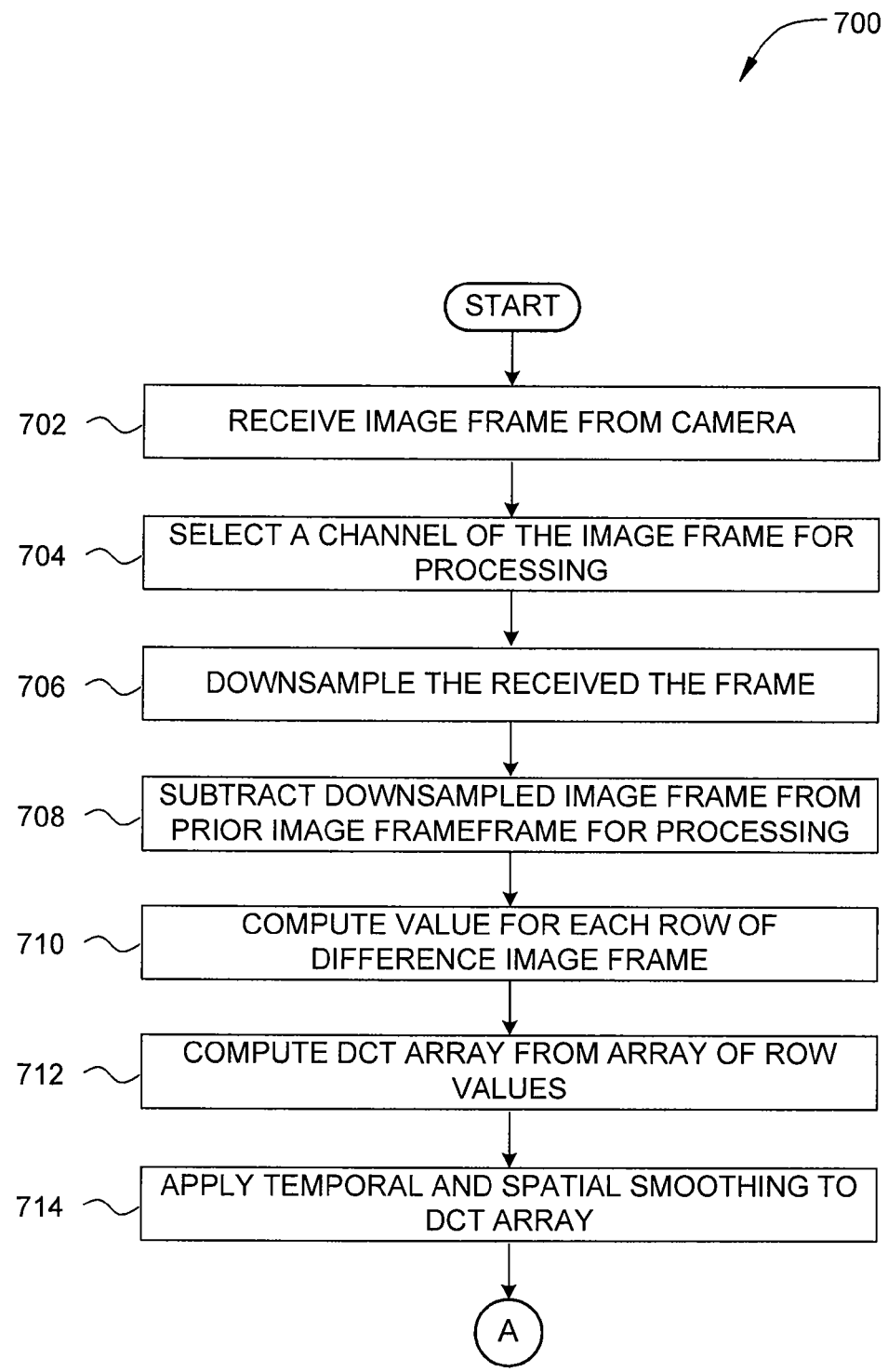
FIGS. 7A-7B set forth a flow diagram of method steps for detecting and correcting flicker in images captured with a rolling shutter, according to one embodiment of the present invention.
Figure 7B:
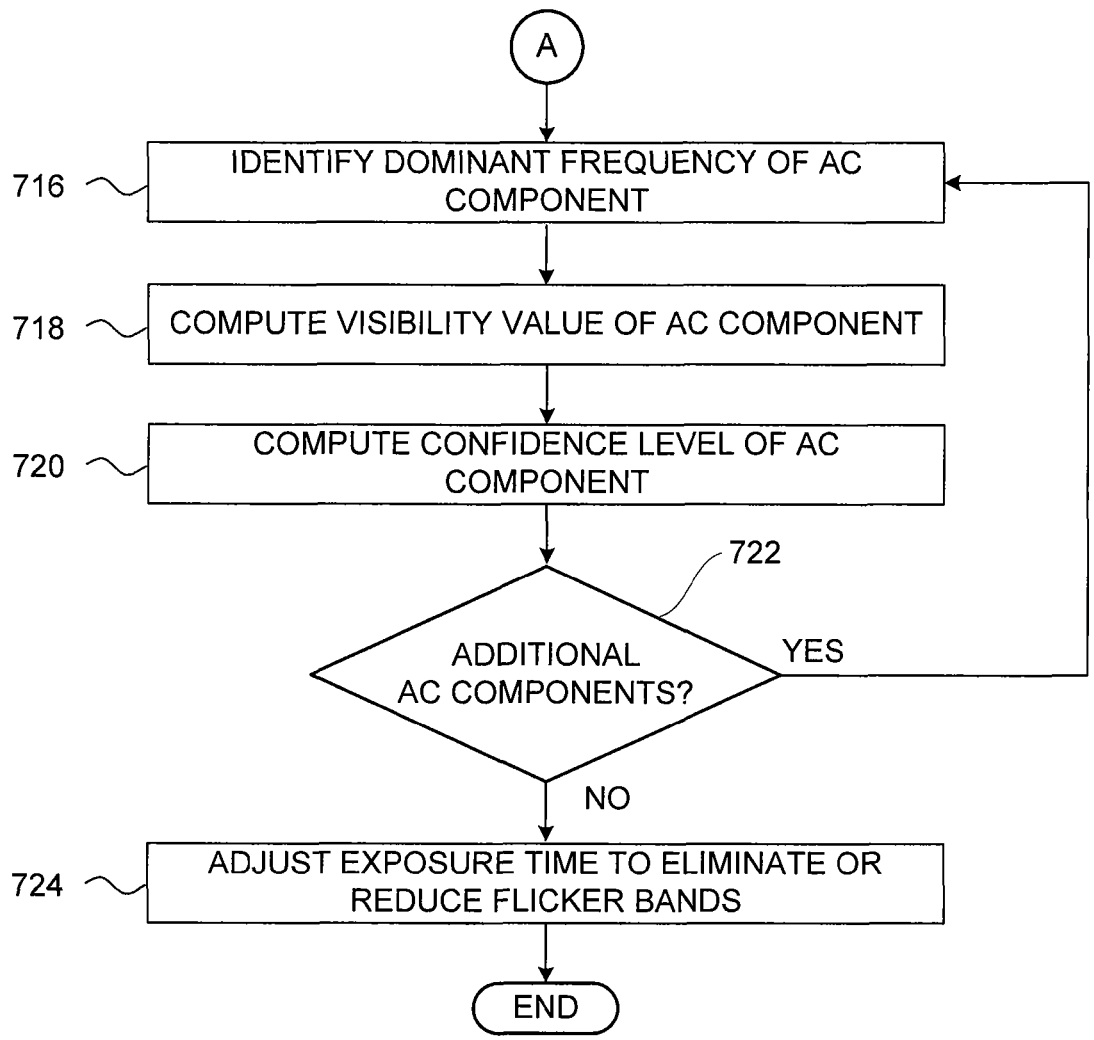

FIGS. 7A-7B set forth a flow diagram of method steps for detecting and correcting flicker in image frames captured with a rolling shutter, according to one embodiment of the present invention. Although the method steps are described in conjunction with the systems of FIGS. 1-6, persons skilled in the art will understand that any system configured to perform the method steps, in any order, falls within the scope of the present invention.

As shown, a method 700 begins at step 702, where the flicker detection and correction engine 300 receives an image frame from the camera 310. At step 704, the flicker detection and correction engine 300 selects a channel, such as the luminance channel, of the received image frame for processing. At step 706, the flicker detection and correction engine 300 downsamples the input frame. At step 708, the flicker detection and correction engine 300 subtracts the downsampled image frame from a prior image frame to generate a difference image frame. At step 710, the flicker detection and correction engine 300 computes a value for each row of the difference image frame. For example, the flicker detection and correction engine 300 could compute the sum or the average of the values for each row of the difference image frame. At step 712, the flicker detection and correction engine 300 computes a DCT array from the array of computed row values.

At step 714, the flicker detection and correction engine 300 applies temporal and spatial smoothing to the DCT array. At step 716, the flicker detection and correction engine 300 identifies a dominant frequency of an AC component associated with a fluctuating light source. At step 718, the flicker detection and correction engine 300 computes a visibility value for the AC component. At step 720, the flicker detection and correction engine 300 computes a confidence level for the AC component. At step 722, the flicker detection and correction engine 300 determines whether additional AC components are indicated in the DCT array. If additional AC components are indicated, then the method 700 proceeds to step 716, described above. If no additional components are indicated, then the method proceeds to step 724, where the flicker detection and correction engine 300 adjusts the exposure time to reduce or eliminate the flicker bands associated with the identified AC components. The method 700 then terminates.

In sum, flicker bars are detected and corrected in image frames captured under fluctuating light sources by cameras that include a rolling shutter. Captured image frames are downsampled for faster analysis. Each row of the downsampled frame is reduced to a single value representing the sum or the average of the pixel values of the respective row. The array of row values is then converted to a one-dimensional DCT array. The DCT values are then used to identify one or more AC components in the image frame, where each of the identified AC components is associated with a fluctuating light source. The frequency of each identified AC component is calculated, along with a visibility value and confidence level for each identified AC component. The exposure time is then adjusted to reduce or eliminate the flicker bars associated with each identified AC component.

One advantage of the disclosed techniques is that the flicker resulting from fluctuating light sources is correctly detected irrespective of the frequency of the fluctuating light source. Flicker correction is achievable in captured image frames whether or not the flicker is produced by 50 Hz or 60 Hz light sources. Because the frequency detection unit does not assume a particular frequency, false detections and missed detections are reduced. Another advantage of the disclosed techniques is that multiple frequency flicker may be removed where image frames scenes are illuminated by multiple light sources that fluctuate at different frequencies.

One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as compact disc read only memory (CD-ROM) disks readable by a CD-ROM drive, flash memory, read only memory (ROM) chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored.

The invention has been described above with reference to specific embodiments. Persons of ordinary skill in the art, however, will understand that various modifications and changes may be made thereto without departing from the broader spirit and scope of the invention as set forth in the appended claims. The foregoing description and drawings are, accordingly, to be regarded in an illustrative rather than a restrictive sense.

Therefore, the scope of embodiments of the present invention is set forth in the claims that follow.

What is claimed is:

1. A method for reducing flicker in image frames captured with a rolling shutter, the method comprising:
   selecting a first channel from a first image frame for processing;
   subtracting each pixel value in the first channel from a corresponding pixel value in a prior image frame to generate a difference image frame;

identifying a first alternating current (AC) component based on a discrete cosine transform (DCT) associated with the difference image frame;

calculating a first metric comprising at least one of a visibility value and a confidence level; and reducing flicker that is present in the first image frame based on the first AC component and the first metric.

2. The method of claim 1, wherein identifying the first AC component comprises:

calculating a row value for each row of pixels in the difference image frame to generate a plurality of row values;

converting the plurality of row values into a first discrete-cosine-transform (DCT) array; and identifying a first frequency in the first DCT array associated with the first AC component.

3. The method of claim 2, wherein reducing flicker that is present in the first image frame comprises selecting an exposure time based on the first frequency to reduce the contribution of flicker corresponding to the first AC component.

4. The method of claim 3, further comprising identifying a second frequency associated with a second AC component that is present in the first image frame; wherein the exposure time is further based on the second frequency.

5. The method of claim 2, further comprising, for each position in the first DCT array:

computing an average value based on a value at the position in the first DCT array, a value at an immediately preceding position in the first DCT array, and a value at an immediately following position in the first DCT array; and replacing the value at the position in the first DCT array with the average value.

6. The method of claim 2, wherein calculating a row value for each row of pixels comprises computing a sum of pixel values associated with the corresponding row of pixels in the difference image frame.

7. The method of claim 2, wherein calculating a row value for each row of pixels comprises computing an average pixel value associated with the corresponding row of pixels in the difference image frame.

8. The method of claim 1, wherein the first metric comprises a visibility value associated with the first AC component based on an amplitude associated with the first AC component and on a variance associated with the first AC component.

9. The method of claim 1, wherein the first metric comprises a confidence level associated with a likelihood that the first AC component contributes to flicker in the first image frame, wherein the confidence level is based on an amplitude associated with the first AC component and on a difference between a first position related to the first AC component and a second position related to a reference sine wave.

10. The method of claim 1, wherein the first channel comprises a luminance channel, a red channel, a blue channel, or a green channel.

11. A computing device, comprising:

a processor configured to:

select a first channel from a first image frame for processing;

subtract each pixel value in the first channel from a corresponding pixel value in a prior image frame to generate a difference image frame;

identify a first alternating current (AC) component based on a discrete cosine transform (DCT) associated with the difference image frame;

calculate a first metric comprising at least one of a visibility value and a confidence level; and reduce flicker that is present in the first image frame based on the first AC component and the first metric.

12. The computing device of claim 11, wherein the processor is configured to identify the first AC component by:

calculating a row value for each row of pixels in the difference image frame to generate a plurality of row values;

converting the plurality of row values into a first discrete-cosine-transform (DCT) array; and identifying a first frequency in the first DCT array associated with the first AC component.

13. The computing device of claim 12, wherein the processor is configured to reduce flicker that is present in the first image frame by selecting an exposure time based on the first frequency to reduce the contribution of flicker corresponding to the first AC component.

14. The computing device of claim 13, wherein the processor is configured to identify a second frequency associated with a second AC component that is present in the first image frame; wherein the exposure time is further based on the second frequency.

15. The computing device of claim 12, wherein the processor is configured to, for each position in the first DCT array:

compute an average value based on a value at the position in the first DCT array, a value at an immediately preceding position in the first DCT array, and a value at an immediately following position in the first DCT array; and replace the value at the position in the first DCT array with the average value.

16. The computing device of claim 11, wherein the first metric comprises a visibility value associated with the first AC component based on an amplitude associated with the first AC component and on a variance associated with the first AC component.

17. The computing device of claim 11, wherein the first metric comprises a confidence level associated with a likelihood that the first AC component contributes to flicker in the first image frame, wherein the confidence level is based on an amplitude associated with the first AC component and on a difference between a first position related to the first AC component and a second position related to a reference sine wave.

18. The computing device of claim 11, wherein the first channel comprises a luminance channel, a red channel, a blue channel, or a green channel.

19. A non-transitory computer-readable storage medium including instructions that, when executed by a processing unit, cause the processing unit to reduce flicker in image frames captured with a rolling shutter, by performing the steps of:

selecting a first channel from a first image frame for processing;

subtracting each pixel value in the first channel from a corresponding pixel value in a prior image frame to generate a difference image frame;

identifying a first alternating current (AC) component based on a discrete cosine transform (DCT) associated with the difference image frame;

calculating a first metric comprising at least one of a visibility value and a confidence level; and reducing flicker that is present in the first image frame based on the first AC component and the first metric.

20. The non-transitory computer-readable storage medium of claim 19, wherein identifying the first AC component comprises:

calculating a row value for each row of pixels in the difference image frame to generate a plurality of row values;

converting the plurality of row values into a first discrete-cosine-transform (DCT) array; and identifying a first frequency in the first DCT array associated with the first AC component.

* * * * *